United States Patent Office 3,273,800
Patented Sept. 20, 1966

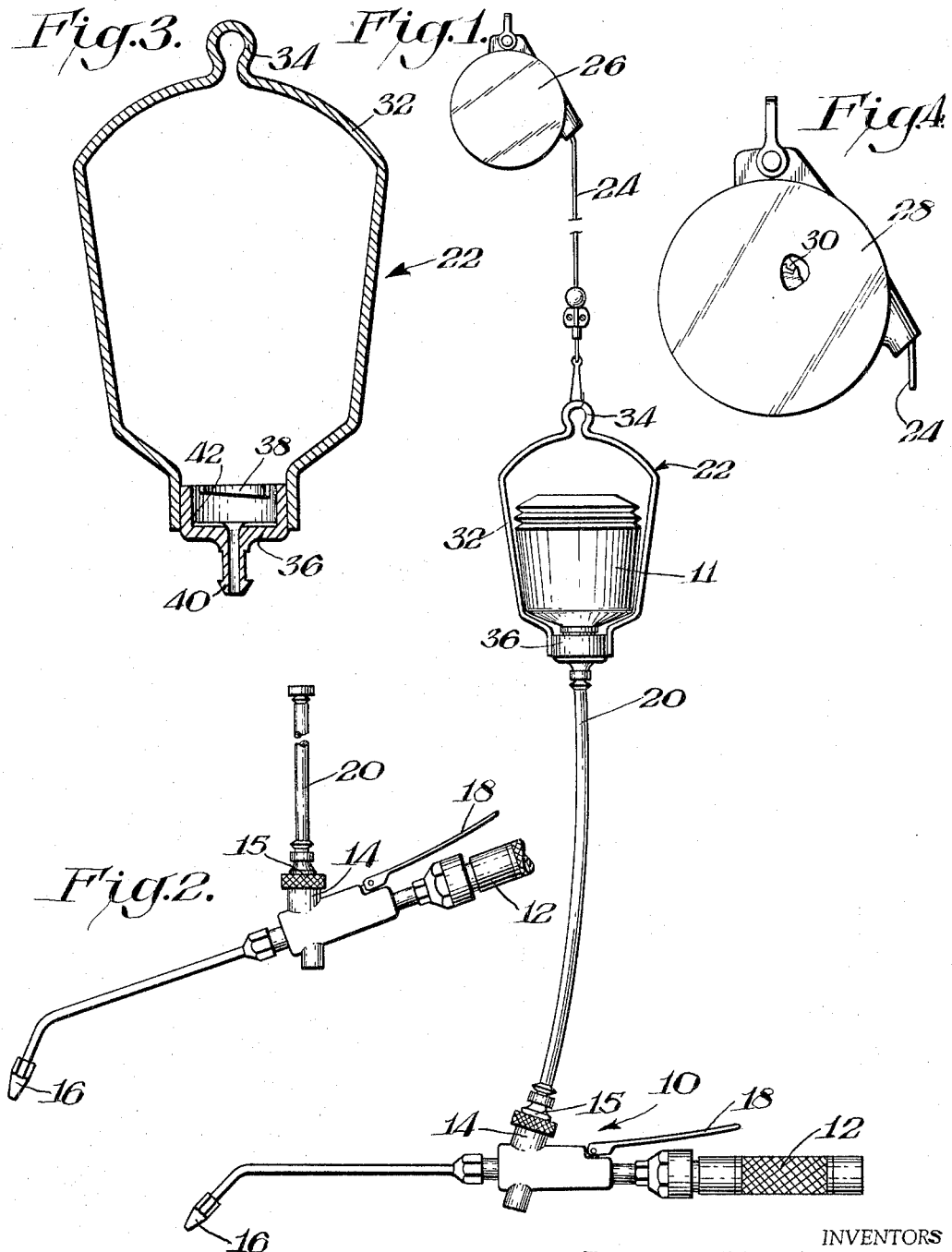

3,273,800
REMOTE POWDER FEED FOR FLAME
SPRAYING TORCH
Don L. Keys, Huntington, John P. Broderick, Bayside, and Frank G. Lohnes, Glen Cove, N.Y., assignors to Eutectic Welding Alloys Corporation, Flushing, N.Y., a corporation of New York
Filed Oct. 23, 1964, Ser. No. 406,137
17 Claims. (Cl. 239—85)

This invention relates to a remote powder feed for a flame spraying torch which entrains powder into the stream of burning gases.

Gas torches have been used for applying metal powders to surfaces by entraining them in the stream of burning gases issuing from them. Since the powder sometimes weighs four times more than the torch and other apparatus, such torches are cumbersome to use when the powder container is mounted directly on the torch. As a result attempts have been made to suspend the powder container remote from the torch. Such attempts have followed two different approaches. In one approach, a short flexible tube connects the container to the torch. With this arrangement, however, the range of portability of the torch is drastically cut down because its operator or welder is limited as to how far he can carry the torch by the small tube length.

In the second approach, the container is suspended and connected to the torch by a long flexible tube. Although this arrangement increases the range of portability of the torch, it has other serious draw-backs. For example, when the torch is used near the container; in other words when the tube is not stretched out or taut, the tube sinks or sags below its connection to the torch. As a result, the supply of powder to the torch is cut off because the powder cannot flow up hill. Additionally, when the tube is very long it is not only clumsy, but also its weight is constantly pulling down on the container.

An object of this invention is to provide an effective and reliable remote feeding arrangement.

A further object is to provide such an arrangement in which the powder container can easily be inserted or removed without dismantling other parts of the assembly.

In accordance with this invention, the powder container is connected to the torch by a short flexible tube. The container in turn is suspended above the torch by a balancer which exposes only a limited amount of line to maintain the container above the torch with its tube substantially vertical to thereby assure the flow of powder to the torch. In use, the welder or operator simply moves the torch to the desired location and the container follows him by extending or retracting the line from the balancer.

The balancer may be of the window shade or releasable brake ratchet type in which a fixed amount of line is exposed from the balance reel and then locked in place. By this arrangement the natural movements of the torch itself are utilized to vary its positions. When the torch is pulled downward the balance reel brake is moved, for example, to an inactive position, while a subsequent downward pull re-activates the brake. Accordingly, the operator simply moves the torch to the desired location, and upon relaxation of his grip on the torch, the amount of exposed line is locked in place. To decrease the amount of exposed line, the operator again pulls downward slightly to inactivate the brake. A spring in the balance reel rewinds the line and when the desired amount is exposed, the operator once more pulls downward to lock the line in place.

This arrangement has the advantage that when the line is locked with a fixed amount exposed, the balancer is not constantly pulling up on the torch. This is especially important when a large amount of powder has been used, because otherwise a larger amount of force by the operator or welder would be necessary to hold the torch down. Additionally, the natural movements of the torch itself are utilized to vary its positions.

In another advantageous form of this invention, the balancer is adjustable and applies constant tension to the container to assure continuous flow of powder to the torch. The amount of tension is initially set to be slightly greater than the weight of the entire assembly. When a sufficient amount of powder has been used, thus making the assembly lighter, the amount of tension in the balancer can then be reset to prevent too strong a force from being applied to the torch.

Advantageously, the container may be connected to the balancer by an open-sided support. The discharge end of the container may be connected to the base of the support slighly above the connection of the short flexible feed tube. As a result, when the container is empty and must be replaced, it can be removed from the support and another container installed without dismantling any other parts of the assembly.

Novel features and advantages of the present invention will become apparent to one skilled in the art from the following description in conjunction with the drawings wherein similar reference characters refer to similar parts and in which:

FIG. 1 is a side view in elevation of the remote feed assembly of one embodiment of this invention;

FIG. 2 is a side view of a portion of the embodiment shown in FIG. 1 with the torch shown in free suspension;

FIG. 3 is a cross-sectional view in elevation of the support shown in FIG. 1; and FIG. 4 is a side view in elevation partially broken away of another balancer used with this invention.

As shown in FIG. 1, a flame spraying torch 10 is fed powder from bellows module or powder container 11. Torch 10 is of the type which is shown, for example, in copending applications Ser. Nos. 286,343, filed June 7, 1963, now Patent No. 3,190,560, and 289,474, filed June 21, 1963, now Patent No. 3,228,610. Torch 10 includes in its rear, a combustible gas section 12 which entrains powder from powder injecting section 14 to deposit the powder from the tip section 16 of the torch. Manually depressable handle 18 actuates the opening and closing of powder injection section 14. Powder is fed from container 11 to powder injection section 14 through a short flexible tube 20, which is, for example, only three to four feet long. The container is suspended above torch 10 by being mounted in a support 22 which in turn is secured to one end of a line 24 exposed from balancer 26 (or balancer 28 of FIG. 4).

Balancer 26 as shown in FIG. 1 is of the type described in, for example, U.S. Patent Nos. 3,093,342 and 1,926,-452. Balancer 26 is adjustable to apply a constant preset amount of tension to support 22 through its line 24. At the beginning of a welding operation, for example, the total weight of the apparatus is 10¼ pounds which includes 8 pounds of powder and 2¼ pounds of apparatus. The spring in balancer 26 is adjusted to apply slightly more tension than the weight of the apparatus so that there is a constant pull upward sufficient to maintain hose 20 taut. FIG. 2 shows hose 20 when torch is freely suspended with the torch body slightly inclined. FIG. 1 shows the disposition of torch 10 during operation when the welder holds the body substantially horizontal. With the assembly of FIG. 1, the welder simply moves the torch to the desired location and accordingly line 24 is extended or retracted in balancer 26. As a result, hose or tube 20 never sags below its point of connection 15 to powder section 14 of torch 10. As powder is used up the weight of the assembly decreases and the operator accordingly is required to use a greater force to hold torch 10 down.

The spring in balancer 26 can then be readjusted periodically to prevent too strong a tension from being applied by balancer 26.

FIG. 4 shows another type of balancer which operates similarly to an ordinary ratchet-type window shade. The details of such a balancer are described in U.S. Patent Nos. 2,745,912 and 2,563,714. Accordingly, its operation will be described only in general terms. Balancer 28 includes a pawl-type releasable brake 30 which is moved to its active and inactive positions by a downward pull of line 24. To use torch 10 the operator simply moves the torch to the desired location and upon release or relaxation of his grip on torch 10, line 24 is locked in place. A subsequent downward pull causes brake 30 to be inactivated so that a spring (not shown) rewinds line 24. When the desired amount of line 24 is again exposed line 24 is once more pulled downward slightly to be locked in place. Accordingly, line 24 follows the natural movements of torch 10 without requiring any special manipulations from the operator.

FIG. 3 shows the details of support 22. As shown therein, support 22 is formed of an open frame by a single strand of material 32 which is shaped to fit around container 11 and which has a loop 34 at its upper end for attachment to line 24 of the balancer 26 or 28. The ends of strand 32 are secured to a cup shaped base 36. Base 36 includes a bayonet coupling 38 for receiving the discharge end of container 11. Additionally, a hollow extension 40 is formed at the bottom of base 36 and communicates with the interior 42 of the base. Extension 40 is shaped to receive one end of hose 20 so that powder can freely flow from container 11 into hose 20.

As shown in FIG. 3, the sides of strand 32 taper outwardly for approximately ¾ their length and then converge toward each other to form loop 34. This shape conveniently holds container 11 so that the level of powder in the container can easily be observed from all positions. Additionally, when the level is too low or container 11 is empty, container 11 may be removed from bayonet coupling 38 and a new container inserted therein without dismantling hose 20 or any other parts of the assembly. This arrangement thus provides a safe and secure support 22 which has the added advantage of ease of replacement of the powder container.

What is claimed is:

1. A remote powder feed support for suspending a powder container and its feed tube above a flame spraying torch to which said feed tube is connected, said support comprising a holder, the base of said holder having container coupling means for mounting said powder container with its discharge end downwardly disposed, tube attaching means in said base for connection to said feed tube, a passageway in said base connecting said container coupling means to said tube attaching means for permitting powder in said container to flow into said tube, connecting means at the top of said holder for suspending said holder above said torch, said holder being shaped to extend around said container, and one side of said holder being open to permit said container to be directly inserted and removed from said holder whereby the replacement of said container is facilitated.

2. A support as set forth in claim 1 wherein said base is cup shaped, said container coupling means being on the inner surface of said base, and said tube attaching means being a hollow extension at the bottom of said base communicating with said inner surface.

3. A support as set forth in claim 2 wherein the body of said holder is an open frame of a single strand of material, the ends of said strand being secured on opposite sides of said base, and said connecting means being a loop in the central portion of said strand.

4. A support as set forth in claim 3 wherein the sides of said holder taper outwardly for approximately ¾ their length, said sides then converging toward each other, and the top of said strand being bent to form said loop.

5. A remote powder feed welding torch assembly comprising a flame spraying torch, said flame spraying torch including a powder injecting section between a gas conducting section and a flame spraying tip, a relatively short flexible tube connected to said powder section of said torch, a powder container disposed with its discharge end downwardly orientated above said torch, said tube being connected to said discharge end whereby powder may flow from said container into said torch, a frame disposed around said container, said container being supported by said frame, a passageway in said frame communicating with said discharge end of said container, said flexible tube being connected to said discharge end of said container by being connected to said frame passageway and thereby communicating with said container, and line containing balancer means connected to said frame for permitting a controlled amount of line to be exposed therefrom whereby said container and said tube are held above said torch in a substantially vertical orientation to assure a flow of powder from said container to said torch.

6. An assembly as set forth in claim 5 wherein said balancer means includes means for applying constant tension to said container, and said balancer means being adjustable to change the amount of said tension.

7. The assembly as set forth in claim 5 wherein said balancer means includes releasable locking means for holding said line with a fixed amount exposed.

8. An assembly as set forth in claim 7 wherein said balancer means includes retracting means for pulling upward on said line when said locking means is released.

9. A remote powder feed welding torch assembly comprising a flame spraying torch, said flame spraying torch having a powder injection section between a gas conducting section and a flame spraying tip, a relatively short flexible tube connected to said powder injection section of said torch, a holder, said tube being connected to the base of said holder, a powder container connected to said base of said holder with its discharge end in communication with said tube whereby powder may flow from said container into said tube, said holder extending around said container, one side of said holder being open whereby said container may be directly inserted and removed from said holder whereby to facilitate the replacement of said container, and line containing balancer means connected to said holder for permitting a controlled amount of line to be exposed therefrom whereby said container and said tube are maintained above said torch in a substantially vertical orientation to assure a flow of powder from said container to said torch.

10. An assembly as set forth in claim 9 wherein said base of said holder is cup shaped, said discharge end of said container being connected to the inner surface of said base, a hollow tubular extension on said base communicating with said discharge end, and said short flexible tube being connected to said extension.

11. An assembly as set forth in claim 10 wherein the body of said holder is an open frame of a single strand of material, the ends of said strand being secured on opposite sides of said base, the central portion of said strand being bent to form a loop above said container, and the line from said balancer means being connected to said loop.

12. An assembly as set forth in claim 9 wherein said balancer means is adjustable for controlling the amount of tension applied to said holder.

13. An assembly as set forth in claim 12 wherein said base of said holder is cup shaped, said container being secured to the inner surface of said base, a hollow tubular extension connected to the bottom of said base and communicating with said discharge end of said container, said short flexible tube being connected to said tubular extension, the body of said holder being an open frame of a single strand of material, the ends of said strand being secured to opposite sides of said base, the central portion of said strand being bent to from a loop above said container, and the line from said balancer means being connected to said loop.

14. An assembly as set forth in claim 9 wherein said balancer means includes releasable locking means for reacting against said line with a fixed amount of line exposed therefrom.

15. An assembly as set forth in claim 14 wherein said base of said holder is cup shaped, said container being secured to the inner surface of said base, a hollow tubular extension connected to the bottom of said base and communicating with said discharge end of said container, said short flexible tube being connected to said tubular extension, the body of said holder being an open frame of a single strand of material, the ends of said strand being secured to opposite sides of said base, the central portion of said strand being bent to form a loop above said container, and the line from said balancer means being connected to said loop.

16. An assembly as set forth in claim 15 wherein said balancer means includes retracting means for pulling said line upward when said locking means is released.

17. An assembly as set forth in claim 5 wherein said frame is open on at least one side.

References Cited by the Examiner
UNITED STATES PATENTS

| | | | |
|---|---|---|---|
| Re. 20,425 | 6/1937 | Schori | 239—85 |
| 1,926,452 | 9/1933 | Norling | 242—107 |
| 2,563,714 | 8/1951 | Foster | 242—107 |
| 2,578,374 | 12/1951 | Pratt | 248—330 |
| 2,745,912 | 5/1956 | Meyer | 191—12.2 |
| 2,957,630 | 10/1960 | Lamb | 239—85 |
| 3,093,342 | 6/1963 | Krohn | 242—107.5 |

EVERETT W. KIRBY, *Primary Examiner.*